United States Patent
Shirato et al.

(10) Patent No.: US 7,214,158 B2
(45) Date of Patent: May 8, 2007

(54) DRIVE MECHANISM FOR A FOUR WHEEL DRIVE TRANSVERSE ENGINE-MOUNTED VEHICLE

(75) Inventors: Kouichirou Shirato, Atsugi (JP); Hanjun Kim, Fuji (JP); Takanori Hagihara, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 240 days.

(21) Appl. No.: 11/085,000

(22) Filed: Mar. 21, 2005

(65) Prior Publication Data

US 2005/0221942 A1  Oct. 6, 2005

(30) Foreign Application Priority Data

Mar. 30, 2004  (JP)  ............... 2004-101064

(51) Int. Cl.
 F16H 37/02  (2006.01)
 F16H 48/06  (2006.01)
(52) U.S. Cl. ...................... 475/200; 475/220
(58) Field of Classification Search ............. 475/200, 475/202, 203, 206, 160, 220, 230; 74/606 R, 74/467
See application file for complete search history.

(56) References Cited

U.S. PATENT DOCUMENTS

| | | | |
|---|---|---|---|
| 4,722,413 A * | 2/1988 | Okubo | 180/247 |
| 5,505,112 A * | 4/1996 | Gee | 74/606 R |
| 6,231,470 B1 * | 5/2001 | Cook et al. | 475/206 |
| 6,719,660 B2 * | 4/2004 | Palazzolo | 475/221 |
| 6,827,662 B2 * | 12/2004 | Nishiji | 475/221 |
| 6,837,820 B1 * | 1/2005 | Baxter | 475/220 |
| 7,056,255 B2 * | 6/2006 | Hay | 475/220 |
| 2005/0221944 A1 | 10/2005 | Shirato et al. | |
| 2006/0073930 A1 * | 4/2006 | Koehler et al. | 475/230 |

FOREIGN PATENT DOCUMENTS

JP    9-150641 A    6/1997

\* cited by examiner

*Primary Examiner*—Roger Pang
(74) *Attorney, Agent, or Firm*—Foley & Lardner LLP

(57) ABSTRACT

A differential unit (102) is provided with a ring gear (10) that meshes with an output gear (21) of a transmission (101), an axle shaft (105) that is connected to front wheels, and a drive gear (11) that is fixed by screws to a plurality of boss portions (3e) and spaced apart from the ring gear (10). A transfer unit (103) disposed rearward of the differential unit (102) is provided with a driven gear (20) that meshes with the drive gear (11). Drive force is transmitted from the driven gear (20) to a propeller shaft (104), and the propeller shaft (104) transmits the drive force to rear wheels. First material-removed portions (12) made of concave portions are formed in an inner circumference of a portion of a case (1) to which the axle shaft (105) is mounted. Second material-removed portions (13) made of concave portions that extend in an axial direction of the axle shaft (105) are formed between the plurality of boss portions (3e).

4 Claims, 3 Drawing Sheets

DRIVE MECHANISM FOR A FOUR WHEEL DRIVE TRANSVERSE ENGINE-MOUNTED VEHICLE

FIELD OF THE INVENTION

This invention relates to a drive mechanism for a four wheel drive transverse engine-mounted vehicle.

BACKGROUND OF THE INVENTION

JP9-150641A, published by the Japan Patent Office in 1997, discloses a drive mechanism of a four wheel drive transverse engine-mounted vehicle shown in FIG. 4. In this mechanism, an axle shaft (not shown) connected to a differential unit 202 is disposed coaxially with an output shaft (not shown) connected to a propeller shaft 204 of a transfer unit 203.

Rotation of the engine is transferred from the differential unit 202 to front wheels through the axle shaft, and is also transmitted to the output shaft of the transfer unit 203. A bevel gear changes the transmission direction of the transmitted rotation of the output shaft and transmits the rotation to the propeller shaft 204. The propeller shaft 204 drives rear wheels through a rear differential unit (not shown).

SUMMARY OF THE INVENTION

In the conventional technique described above, the differential unit and the transfer unit are disposed coaxially. Accordingly, there is no space in the forward and rearward direction between the engine and the transfer unit, and a degree of freedom in part layout for an exhaust system is low.

Arranging the transfer unit offset rearward of the differential unit may be considered in order to resolve this problem. However, in order to transmit drive force from the differential unit to the transfer unit with such arrangement, a ring gear that meshes with an output gear of a transmission, and a drive gear that meshes with a driven gear of the transfer unit become arranged offset in an axle shaft direction, and the differential unit becomes longer in the axle shaft direction. A new problem thus arises where the weight of the differential unit increases.

An object of this invention is to suppress increases in weight of a differential unit while securing space between an engine and a transfer unit.

In order to achieve above object, this invention provides a drive mechanism used in a four wheel drive transverse engine-mounted vehicle to transmit drive force of an engine from a transmission to front wheels and rear wheels.

The drive mechanism comprises a differential unit comprising: a rotatable case; a ring gear fixed to the case, the ring gear meshing with an output gear of the transmission; an axle shaft mounted within the case, to which drive force from the ring gear is transmitted, and which transmits the drive force to the front wheels; and a drive gear fixed to a plurality of boss portions formed in the case and disposed spaced apart from the ring gear in an axial direction of the axle shaft.

The drive mechanism further comprises a transfer unit disposed rearward of the differential unit and comprising a driven gear that meshes with the drive gear; a propeller shaft to which drive force from the driven gear is transmitted and which transmits the drive force to the rear wheels; a first material-removed portion made of a concave portion and formed in an inner circumference of a portion to which the axle shaft of the case is mounted; and a second material-removed portion made of a concave portion and extending in the axial direction of the axle shaft, the second material-removed portion being formed between each of the plurality of boss portions.

The details as well as other features and advantages of this invention are set forth in the remainder of the specification and are shown in the accompanying drawings.

DETAILED DESCRIPTION OF THE PREFERRED EMBODIMENTS

Figure 1:
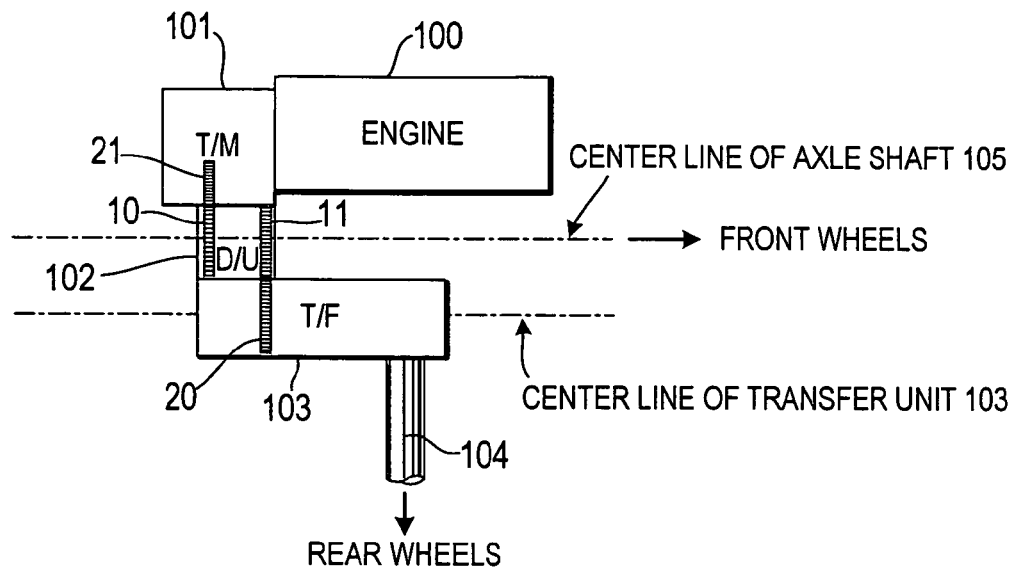
FIG. 1 is a schematic diagram of a drive mechanism of a four wheel drive vehicle according to this invention.

FIG. 1 shows a schematic diagram of a drive mechanism of a four wheel drive vehicle of this invention.

An engine 100 is a so-called transverse-mounted engine having a crankshaft of the engine 100 disposed in a right and left direction of a vehicle. A transmission 101 is disposed onto a left side of the engine 100. A differential unit 102 is connected to a vehicle rear side of the transmission 101. A transfer unit 103 is disposed rearward of the differential unit 102.

Drive force from the engine 100 is transmitted from the transmission 101 and the differential unit 102 to an axle shaft 105, driving front wheels, and is transmitted from the differential unit 102 and the transfer unit 103 to a propeller unit 104, driving rear wheels. This layout is one in which the central axis of the transfer unit 103 is disposed in parallel with, and is offset rearward of, the central axis of the axle shaft 105 that drives the front wheels. Consequently, a space can be secured directly behind the engine 100, and the degree of freedom in laying out an exhaust system increases.

Figure 2:
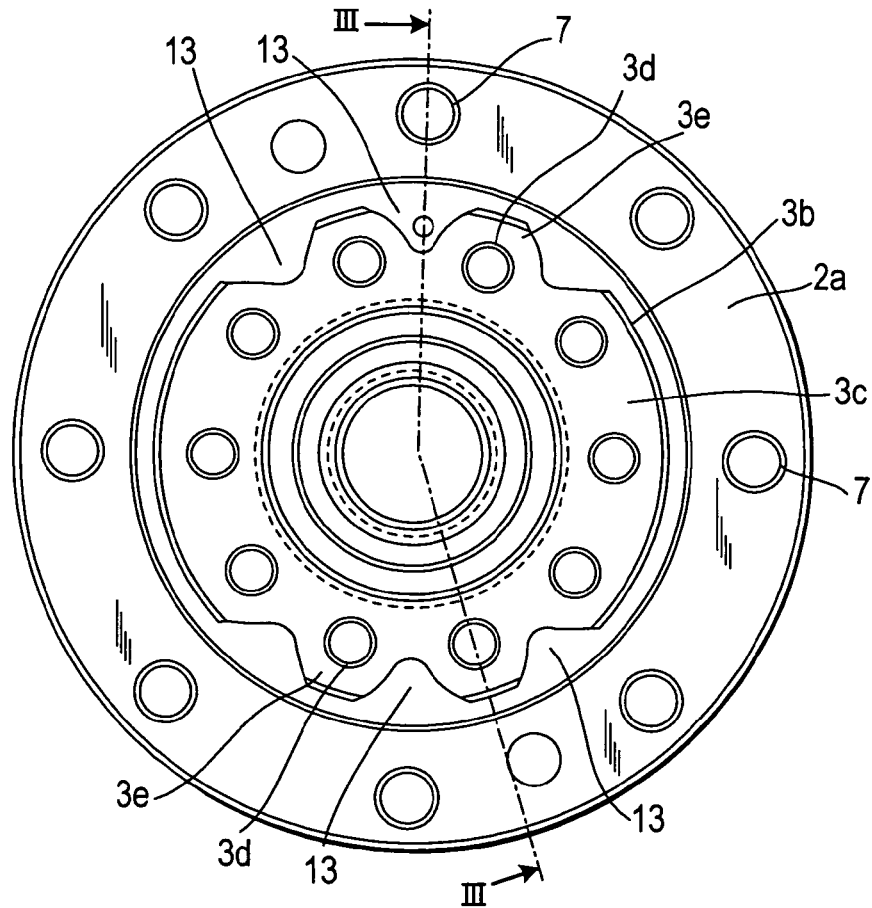
FIG. 2 is a front view of a differential unit.
Figure 3:
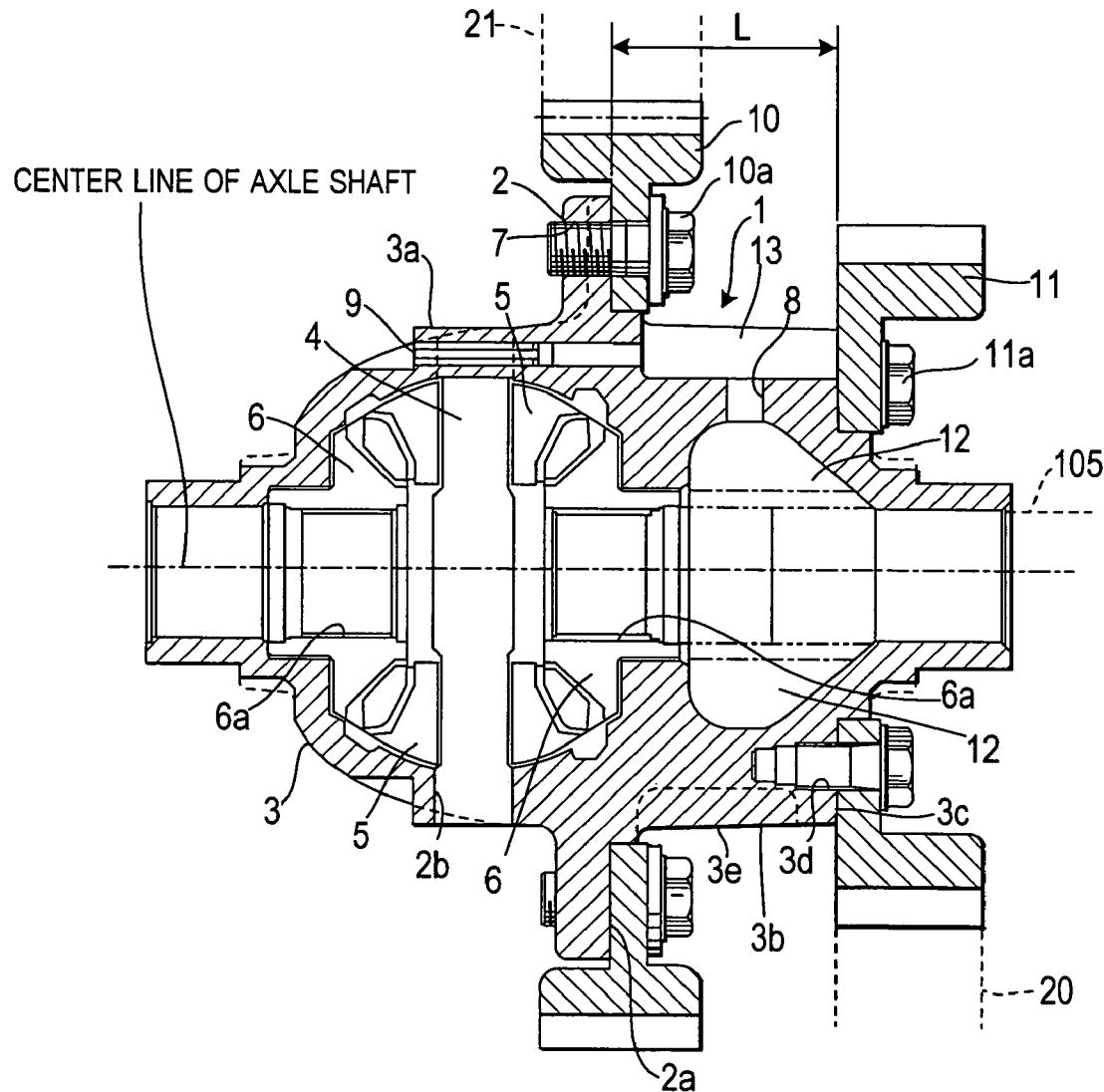
FIG. 3 is a cross sectional diagram taken along the line III—III of FIG. 2.
Figure 4:
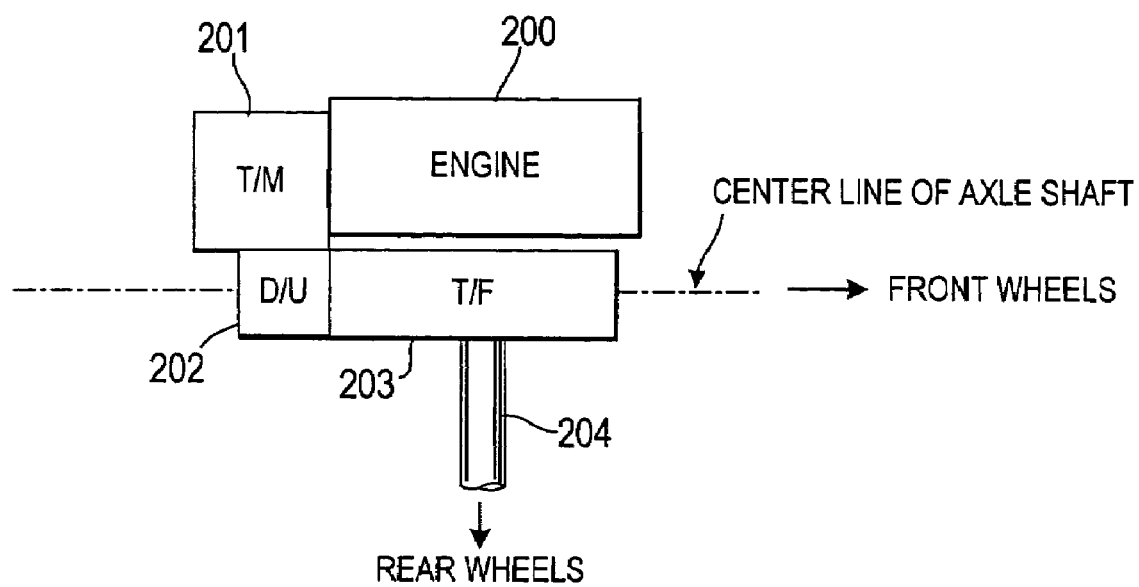
FIG. 4 is a schematic diagram of a conventional drive system for a four wheel drive vehicle.

FIG. 2 and FIG. 3 show a structure of the differential unit 102. FIG. 3 shows a cross section taken along the line III—III of FIG. 2. A state is shown in which a ring gear 10 and a drive gear 11 are attached.

The ring gear 10, which meshes with an output gear 21 of the transmission 101, is fixed to an outer circumference of a case 1 that is supported so as to be capable of rotating within a housing (not shown). The case 1 rotates integrally with the ring gear 10 about the axle shaft 105. Further, as described hereinafter, rotation of the ring gear 10 is transmitted to a pair of side gears 6 that mesh with a pair of pinion gears 5 disposed within the case 1, and the axle shaft 105 fixed to the side gear 6 rotates, driving the front wheels connected to the axle shaft 105.

The drive gear 11 that transmits drive force to the transfer unit 103 is fixed to the outer circumference of the case 1, coaxially with the ring gear 10 and offset by a length L in the axial direction of the axle shaft 105. The drive gear 11 rotates together with the case 1, and the drive gear 11 causes a driven gear 20 of the transfer unit 103, which meshes with the drive gear 11, to rotate. When rotation is transmitted to the driven gear 20, drive force is transmitted to the rear wheels, through the propeller shaft 104. The ring gear 10 and the drive gear 11 are disposed coaxially with the axle shaft 105 that is joined to the pair of side gears 6.

The case 1 is roughly divided into a case main body 3 that houses a pinion shaft 4, the pinion gears 5, and the side gears 6, and a disk shaped flange 2 that extends outward from the case main body 3.

An end surface 2a that is orthogonal to the centerline of the axle shaft 105 is provided to the flange 2. Female screws 7 are provided at equal intervals in the end surface 2a in order to fix the ring gear 10. The ring gear 10 is fixed to the end surface 2a of the flange 2 by bolts 10a.

The case main body 3 includes a hollow differential portion 3a that houses the pinion shaft 4, the pinion gears 5, and the side gears 6, and a gear attachment portion 3b through which the axle shaft 105 passes and to which the drive bear 11 that transmits drive force to the transfer unit 103 is fixed.

A shaft hole 2b is formed passing through the differential portion 3a in a direction orthogonal to the centerline of the axle shaft 105. The pinion shaft 4 is installed in the shaft hole 2b. The pinion shaft 4 is fixed to the differential portion 3a by a pin 9.

The pair of pinion gears 5 are disposed in an outer circumference of the pinion shaft 4. The pinion gears 5 mesh with the pair of right and left side gears 6 that are joined coaxially to the axle shaft 105.

Through hole portions 6a are formed in the side gears 6 coaxially with the centerline of the axle shaft 105. A spline is formed in each of the shaft hole portions 6a, and the axle shaft 105 that drives the front wheels is joined through the splines.

An end face 3c that is orthogonal to the centerline of the axle shaft 105 is formed on the gear attachment portion 3b, which is offset by an amount L in the axial direction of the axle shaft 105 from the end surface 2a of the flange 2 and to which the ring gear 10 is attached. Female screws 3d for attaching the drive gear 11 by bolts 11a are formed at predetermined equal intervals in the end surface 3c. The position of the drive gear 11 which determines the offset amount L of the end surface 3c in the axial direction is determined by the reduction gear ratio of the rotation speed transmitted from the differential unit 102 to the transfer unit 103, and by the layout requirements. Reducing the offset amount L is necessary in order to make the differential unit 102 smaller and lighter in weight. However, there is a limit to how much the offset amount L can be decreased due to layout factors and the like, as discussed hereinafter.

The inner diameter of the gear attachment portion 3b is set based on the outer diameter of the axle shaft 105 that passes through the case 1 as shown by the alternate long and short dash line in FIG. 3. On the other hand, the outer diameter thereof is determined by the attachment position of the drive gear 11 that is attached to the end surface 3c, and by the size of the attachment bolts. The position of the end surface 3c is offset in the axial direction from the end surface 2a of the flange 2 by the amount L, and the difference in size between the inner diameter and the outer diameter of the gear attachment portion 3b is large. As a consequence, there is excess material between the end surface 2a of the flange 2 and the end surface 3c of the gear attachment portion 3b.

Referring to FIG. 3, annular first material-removed portions 12 are formed in the case 1 with this invention by removing the excess material in a concave shape in the inner circumference of the gear attachment portion 3b which faces the axle shaft 105. The amount of the excess material removed is determined by considering the strength of the case 1 and the processes used in manufacturing the case 1. In addition, referring to FIG. 2 and FIG. 3, boss portions 3e for the female screws 3d are formed in order to attach the drive gear 11. Second material-removed portions 13 that extend in the axial direction of the axle shaft 105 are formed in the outer circumference of the case 1. In the second material-removed portions 13, excess material between each of the boss portions is removed while ensuring a contact surface area between each of the boss portions 3e necessary in order to securely fasten the drive gear 11. By forming the first material-removed portions 12 and the second material-removed portions 13, the outer diameter side of the gear attachment portion 3b of the case 1 can be made lighter in weight. It should be noted that each of the second material-removed portions 13 is formed considering the strength of the case 1 and the like, similar to the first material-removed portions 12. Referring to FIG. 3, by removing material up to the vicinity of the end surface 2a of the flange 2, the weight-reducing effect can be increased.

Referring to FIG. 3, further, a through hole 8 is formed in the case 1 passing through in a radial direction from the first material-removed portion 12. Lubricating oil that collects in the first material-removed portion 12 is discharged by the through hole 8. Forming the through hole 8 in the case 1 to discharge the lubricating oil maintains the lubricating performance in inner portions of the case.

As describe above, according to this invention, the first material-removed portions 12 are formed on the inner side, while the second material-removed portions 13 are formed on the outer side, of the gear attachment portion 3b of the case 1 which is provided between the ring gear 10 and the drive gear 11 that are laid out with an offset in the axial direction of the axle shaft 105, with excess material being removed form the gear attachment portion 3b. Therefore the differential unit 102 can be made lighter in weight. In addition, by forming the through hole 8 that passes through the case 1 in a radial direction from the first material-removed portion 12, lubricating oil that collects in the first material-removed portion 12 is discharged, and the lubricating performance can be maintained.

What is claimed is:

1. A drive mechanism used in a four wheel drive transverse engine-mounted vehicle to transmit drive force of an engine from a transmission to front wheels and rear wheels, the drive mechanism comprising:
a differential unit comprising:
    a rotatable case;
    a ring gear fixed to the case, the ring gear meshing with an output gear of the transmission;
    an axle shaft mounted within the case, to which drive force from the ring gear is transmitted, and which transmits the drive force to the front wheels; and
    a drive gear fixed to a plurality of boss portions formed in the case and disposed spaced apart from the ring gear in an axial direction of the axle shaft;
a transfer unit disposed rearward of the differential unit and comprising a driven gear that meshes with the drive gear;
a propeller shaft to which drive force from the driven gear is transmitted and which transmits the drive force to the rear wheels;
a first material-removed portion made of a concave portion and formed in an inner circumference of a portion to which the axle shaft of the case is mounted; and a second material-removed portion made of a concave portion and extending in the axial direction of the axle shaft, the second material-removed portion being formed between each of the plurality of boss portions.

2. The drive mechanism as defined in claim 1, wherein a shape of the concave portion of the first material-removed portion is set according to a strength required of the case.

3. The drive mechanism as defined in claim 1, wherein a shape of the concave portion of the second material-removed portion is set according to a strength required of the case.

4. The drive mechanism as defined in claim 1, further comprising a through hole that extends from a bottom of the concave portion of the first material-removed portion to an outer surface of the case.

* * * * *